United States Patent
Rozman et al.

(10) Patent No.: US 8,134,331 B2
(45) Date of Patent: Mar. 13, 2012

(54) MOTOR DRIVE SYSTEM WITH FLUX REGULATED PM GENERATOR

(75) Inventors: Gregory I. Rozman, Rockford, IL (US); Vietson M. Nguyen, Rockford, IL (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 270 days.

(21) Appl. No.: 12/437,732

(22) Filed: May 8, 2009

(65) Prior Publication Data
US 2010/0283415 A1 Nov. 11, 2010

(51) Int. Cl.
*H02P 27/04* (2006.01)

(52) U.S. Cl. .......... 318/800; 318/140; 318/149; 322/27; 322/28; 290/10; 290/11; 290/14; 290/15; 290/19

(58) Field of Classification Search ............... 318/800, 318/140, 149; 322/27, 28; 290/10, 11, 14, 290/15, 19, 46, 47
See application file for complete search history.

(56) References Cited

U.S. PATENT DOCUMENTS

| | | | |
|---|---|---|---|
| 5,218,520 A | 6/1993 | Rozman | |
| 6,320,356 B1 * | 11/2001 | Asai et al. | 322/27 |
| 6,586,914 B2 * | 7/2003 | Garrigan et al. | 322/28 |
| 6,965,183 B2 | 11/2005 | Dooley | |
| 7,439,713 B2 | 10/2008 | Dooley | |

OTHER PUBLICATIONS

U.S. Appl. No. 12/435,534, filed May 5, 2009, Vietson Nguyen.
U.S. Appl. No. 12/355,864, filed Jan. 19, 2009, Jacek F. Gieras.

* cited by examiner

*Primary Examiner* — Walter Benson
*Assistant Examiner* — Erick Glass
(74) *Attorney, Agent, or Firm* — Stephen G. Mican

(57) ABSTRACT

A method of generating and controlling power for an alternating current (AC) motor by means of at least one controlled permanent magnet machine (PMM) with a permanent magnet (PM) rotor and a stator with a magnetic flux diverter circuit for controlling the output of the PMM, comprises the steps of: rotating the PM rotor at a velocity sufficient to develop a high frequency alternating current (HFAC) power output from the stator; transforming the HFAC output to produce a variable low frequency alternating current (AC) motor control output for the motor; sensing desired motor control parameters; generating a control signal responsive to the sensed parameters; and applying the control signal to the magnetic flux diverter circuit to control the motor control output.

17 Claims, 5 Drawing Sheets

Figure 2
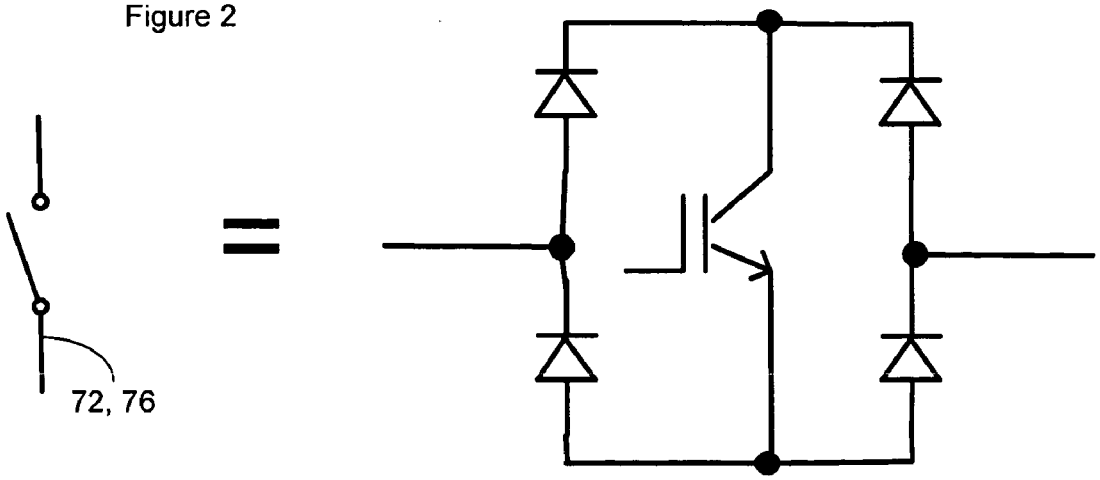
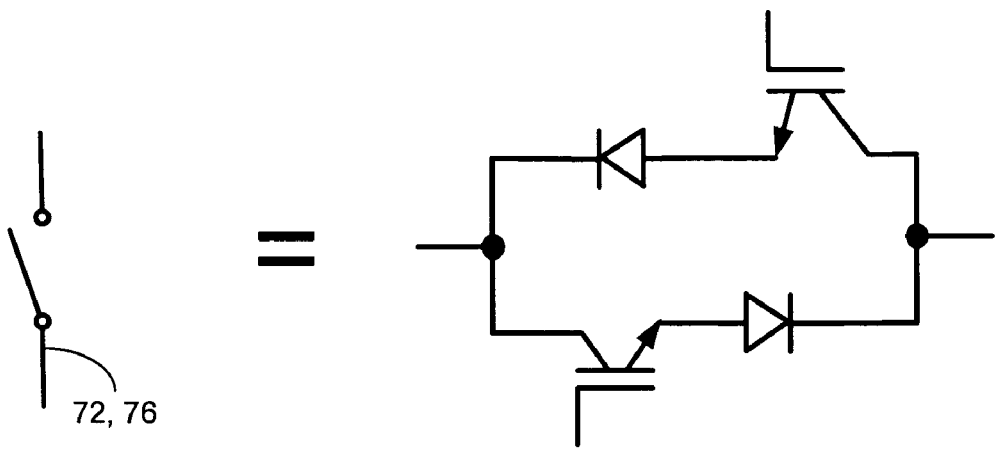
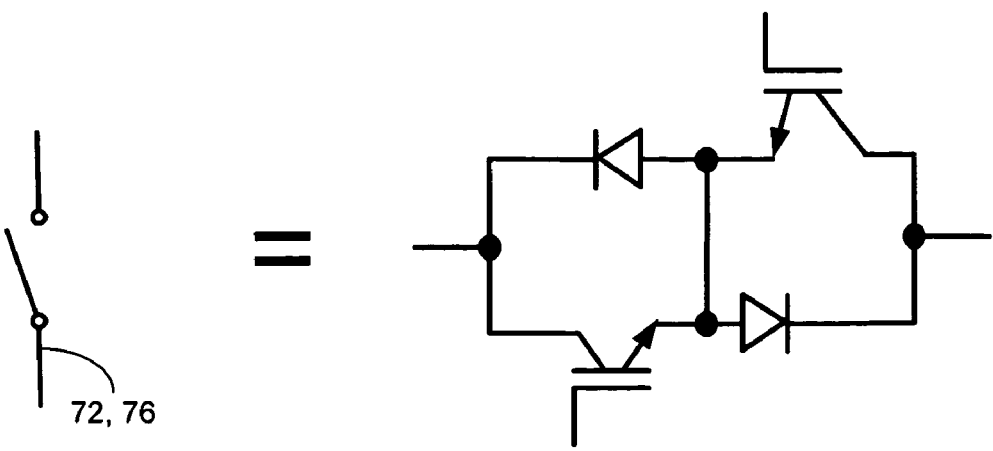

MOTOR DRIVE SYSTEM WITH FLUX REGULATED PM GENERATOR

FIELD OF THE INVENTION

The invention relates to motor drive systems for alternating current (AC) motors, and more particularly to AC motor drive systems employing magnetic flux control.

BACKGROUND OF THE INVENTION

It is of great importance to minimise the size and weight of motor drive systems for mobile applications. Such motor drive systems generally derive electrical power for their operation from a mechanical source that comprises a prime mover, such as an engine. An electrical generator converts mechanical power from the prime mover into electrical power. Most commonly, the motor drive system utilises existing AC power and converts it variable frequency AC to drive a multiphase AC motor. The multiphase AC has a frequency or range of frequencies, such as zero to approximately 400 Hz, which is sufficient to drive the AC motor through a desired range of speeds.

The electrical generator generally has a multiphase AC output at a relatively low fixed fundamental frequency, generally about 50, 60, or 400 Hz, or a variable frequency that covers the range of approximately 360 to 800 Hz, which requires conversion in the motor drive system from generator multiphase AC output to the range of frequencies sufficient to drive the AC motor at the desired range of speeds. Such a motor drive system requires high power electronics, which add size, weight and cost to the system. It would be desirable to use low power electronics to vary the output of the generator itself to produce the necessary range of frequencies sufficient to drive the AC motor at the desired range of speeds.

SUMMARY OF THE INVENTION

The invention generally comprises a method of generating and controlling power for an alternating current (AC) motor by means of at least one controlled permanent magnet machine (PMM) with a permanent magnet (PM) rotor and a stator with a magnetic flux diverter circuit for controlling the output of the PMM, comprising the steps of: rotating the PM rotor at a velocity sufficient to develop a high frequency alternating current (HFAC) power output from the stator; transforming the HFAC output to produce a variable low frequency alternating current (AC) motor control output for the motor; sensing desired motor control parameters; generating a control signal responsive to the sensed parameters; and applying the control signal to the magnetic flux diverter circuit to control the motor control output.

DESCRIPTION OF THE DRAWINGS

FIG. 2 are schematic diagrams of three possible bi-directional switch arrangements for the motor drive system shown in FIG. 1.

DETAILED DESCRIPTION OF THE INVENTION

Figure 1:
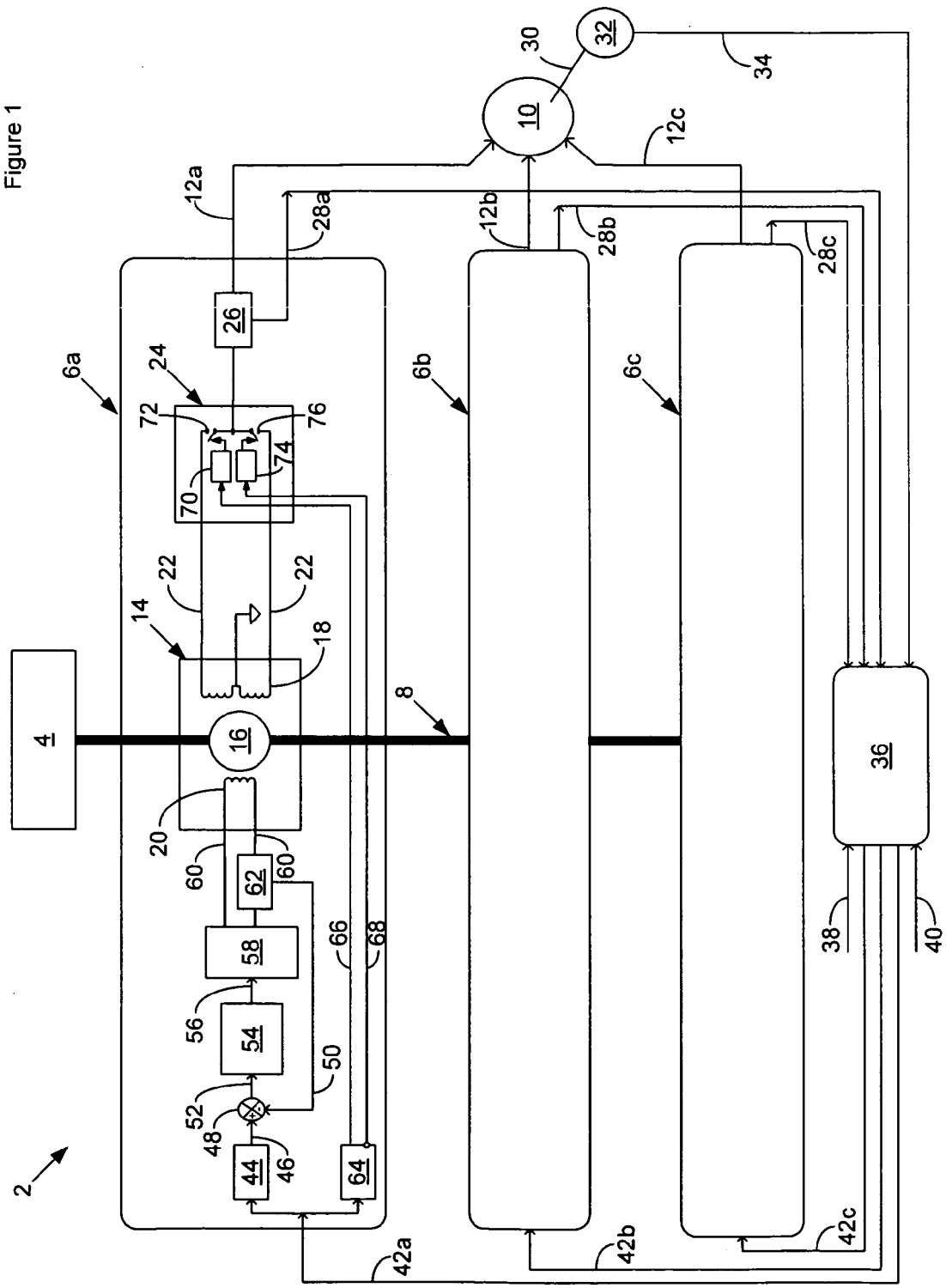
FIG. 1 is a schematic diagram of a motor drive system according to a first possible embodiment of the invention.

FIG. 1 is a schematic diagram of a motor drive system 2 according to a first possible embodiment of the invention. The motor drive system 2 comprises a prime mover 4, such as a gas turbine engine, that couples to at least one high frequency alternating current (HFAC) generator module 6 by means of a prime mover drive shaft 8. Each HFAC generator module 6 includes a variable low frequency alternating current (AC) motor control output that an AC motor 10 receives by way of a corresponding generator module output line 12. For this embodiment of the motor drive system 2, an AC motor 10 with N phases will receive N motor control outputs, each representing a different phase of the AC motor 10, from N different generator modules 6 by way of corresponding generator module output lines 12. Typically the AC motor 10 will have three phases, and therefore receive three phases of motor control outputs from three respective generator modules 6 by way of three respective generator module output lines 12, as shown in FIG. 1. Alternatively, the AC motor 10 may have two or more than three phases.

Each generator module 6 comprises a single phase controlled permanent magnet machine (PMM) 14 that serves as a HFAC generator, such as of the type described in co-pending patent application U.S. Pat. No. 8,085,003 to Gieras et al., owned by the assignee of this application and hereby incorporated by reference. Each PMM 14 has a permanent magnet (PM) rotor 16 and a stator 18 with a magnetic flux diverter circuit 20. The prime mover 4 rotates the PM rotor 16 by way of the prime mover drive shaft 8 at a velocity sufficient to develop a HFAC current in the stator 18. The stator 18 has a centre-tapped single phase output with the centre tap grounded to provide a balanced single phase HFAC output with respect to ground on stator output lines 22. A bi-directional switching circuit 24 receives the balanced single phase HFAC output on the stator output lines 22 and transforms it to produce the motor control output of the generator module 6 on its respective generator module output line 12. A current sensor 26 may monitor the current level of the motor control output on the generator module output line 12 and generate a respective current level output signal on a current sensor output line 28 that is representative of the sensed current level.

The AC motor 10 has a motor drive shaft 30 that revolves in proportion to the frequency of the variable low frequency motor control outputs that it receives on the generator module output lines 12. A position sensor 32 may sense the angular position of the motor drive shaft 30 and generate a respective motor position signal on a position sensor output line 34 that is representative of the sensed motor drive shaft position.

A motor controller 36 receives motor control parameters comprising the current level output signal on each current sensor output line 28 and the motor position signal on the position sensor output line 34, as well as a speed reference signal on a speed signal line 38 and a direct current reference signal Id_ref on a direct current reference signal line 40, to generate a control signal for each generator module 6 on a respective control signal line 42 that has a fundamental frequency corresponding to the desired frequency of the variable low frequency AC motor control output on its respective generator module output line 12.

An absolute value output circuit 44 within each generator module 6 receives its respective control signal by way of its respective control signal line 42 and converts it to an absolute value signal on an absolute value signal line 46. A summer 48 receives the absolute value signal on the absolute value signal line 46 and a magnetic flux diverter circuit current signal on a magnetic flux diverter circuit current signal line 50 by way of an inverted input to generate a summer difference signal on a summer difference signal line 52. A magnetic flux diverter circuit current regulator 54 receives the summer difference signal on the summer difference signal line 52 to generate a magnetic flux diverter circuit current drive signal on a magnetic flux diverter circuit current drive signal line 56.

An H-bridge 58 receives the magnetic flux diverter circuit current drive signal on a magnetic flux diverter circuit current drive signal line 56 to produce a magnetic flux diverter circuit current on H-bridge output lines 60. The magnetic flux diverter circuit 20 receives the magnetic flux diverter circuit current on the H-bridge output lines 60 to control the level of the balanced single phase HFAC output on the stator output lines 22. A magnetic flux diverter circuit current sensor 62 senses the level of current passing through the H-bridge output lines 60 and generates the a magnetic flux diverter circuit current signal on the magnetic flux diverter circuit current signal line 50 to be representative of the sensed current level.

A zero crossing detector circuit 64 senses the zero crossings of the control signal on the control signal line 42 and generates a zero crossing output signal on a zero crossing output signal line 66 and an inverted zero crossing output signal on an inverted zero crossing output signal line 68. A first bi-directional gate drive circuit 70 in the bi-directional switching circuit 24 receives the zero crossing output signal by way of the zero crossing output signal line 66 and generates a respective first gate drive signal to drive a respective first bi-directional switch 72 and control current flow between one of the stator output lines 22 and the generator module output line 12. A second bi-directional gate drive circuit 74 receives the inverted zero crossing output signal by way of the inverted zero crossing output signal line 68 and generates a respective second gate drive signal to drive a respective second bi-directional switch 76 and control current flow between the other one of the stator output lines 22 and the generator module output line 12. FIG. 2 are schematic diagrams of three possible bi-directional switch arrangements for the bi-directional switches 72 and 76 shown in FIG. 1.

Since each control signal is AC, with a fundamental frequency that represents the desired frequency of the variable low frequency AC motor control output of its respective generator module 6 on its respective generator module output line 12, the action of the generator module 6 is that of an electro-mechanical amplifier, wherein the control signal on the control signal line 42 may be of low power to control the high motor control output on the generator module output line 12. Another way of looking at the action is that the relatively low power control signal on the control signal line 42 by means of the magnetic flux diverter circuit 20 modulates the HFAC output on the stator output lines 22 and the bi-directional switching circuit 24 demodulates the HFAC output on the stator output lines 22 to produce the high motor control output on the generator module output line 12 with the same frequency as its respective control signal on the control signal line 42.

Figure 3:
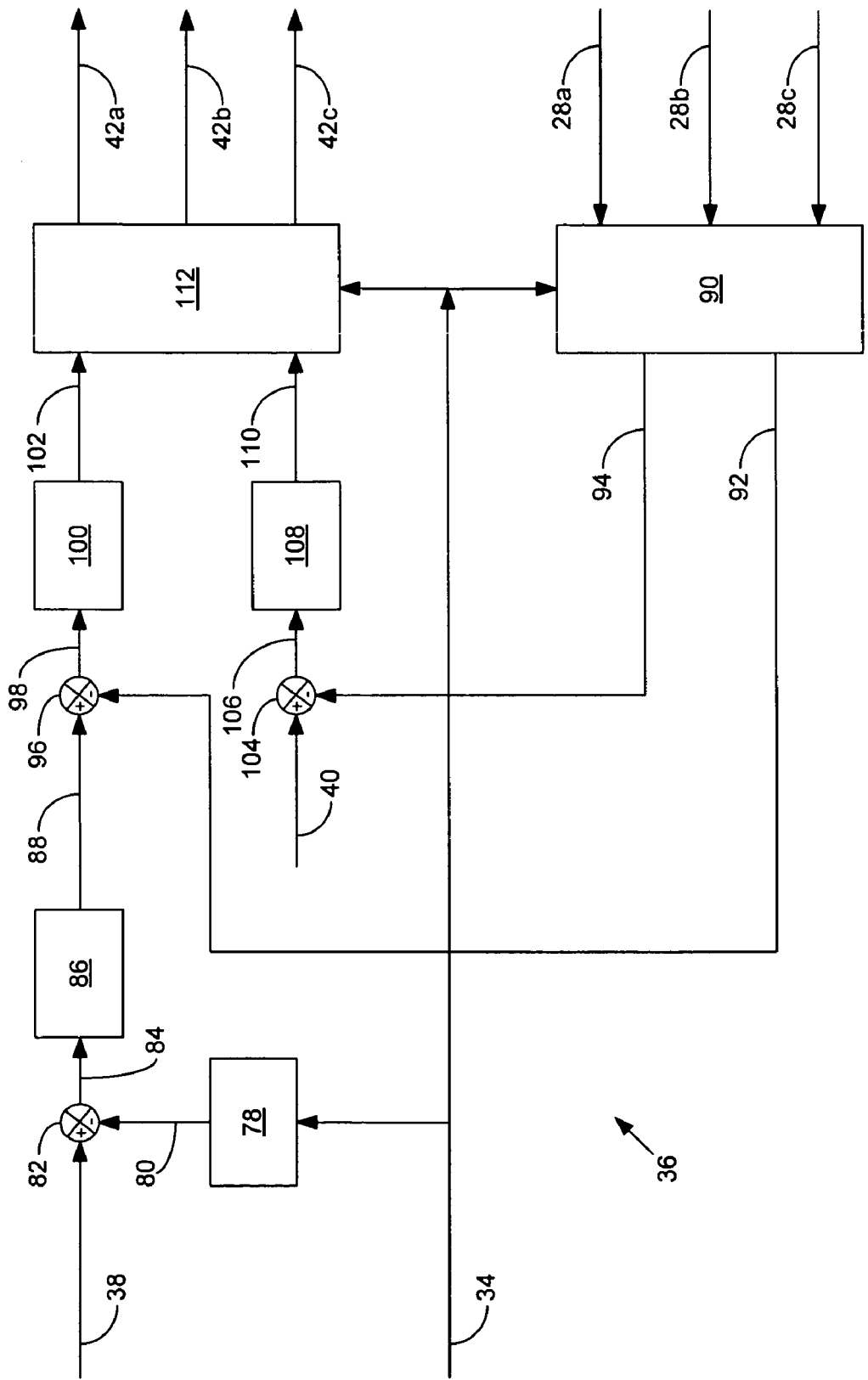
FIG. 3 is a schematic diagram of a motor controller according to a possible embodiment of the invention for the motor drive system shown in FIG. 1.

FIG. 3 is a schematic diagram of the motor controller 36 according to a possible embodiment of the invention for the motor drive system 2 shown in FIG. 1. A speed estimator circuit 78 receives the motor position signal on the position sensor output line 34 and generates a respective motor speed signal on a speed estimator output line 80. A summer 82 receives the speed reference signal on the speed signal line 38 and the motor speed signal on the speed estimator output line 80 by way of an inverted input to generate a respective summer difference signal on a summer output line 84. A motor speed controller circuit 86 receives the summer difference signal on the summer output line 84 and generates a respective motor quadrature reference current signal Iq_ref on a speed controller circuit output line 88.

A Park's transformation circuit 90 receives the current level output signal from the current sensor 26 for each generator module 6 by way of the current sensor output lines 28 and the motor position signal on the position sensor output line 34 to generate a respective motor quadrature current feedback signal Iq_fdbk on a quadrature current feedback line 92 and a respective motor direct current feedback signal Id_fdbk on a direct current feedback line 94. A summer 96 receives the motor quadrature reference current signal Iq_ref on the speed controller circuit output line 88 and the motor quadrature current feedback signal Iq_fdbk on the quadrature current feedback line 92 by way of an inverted input to generate a summer difference signal on a summer output line 98. A proportional plus integral (PI) current regulator 100 receives the summer difference signal on the summer output line 98 to generate a respective quadrature voltage control signal Vq_ref on a PI controller output line 102.

A summer 104 receives the direct current reference signal Id_ref on the direct current reference signal line 40 and the motor direct current feedback signal Id_fdbk on the direct current feedback line 94 by way of an inverted input to generate a direct electrical potential difference control signal on a summer output line 106. A PI current regulator 108 receives the summer difference signal on the summer output line 106 to generate a respective direct voltage control signal Vd_ref on a PI controller output line 110. An inverse Park's transformation circuit receives the quadrature voltage control signal Vq_ref on the PI controller output line 102, the direct voltage control signal Vd_ref on a PI controller output line 110 and the motor position signal on the position sensor output line 34 to generate the control signal for each generator module 6 on the respective control signal lines 42.

Figure 4:
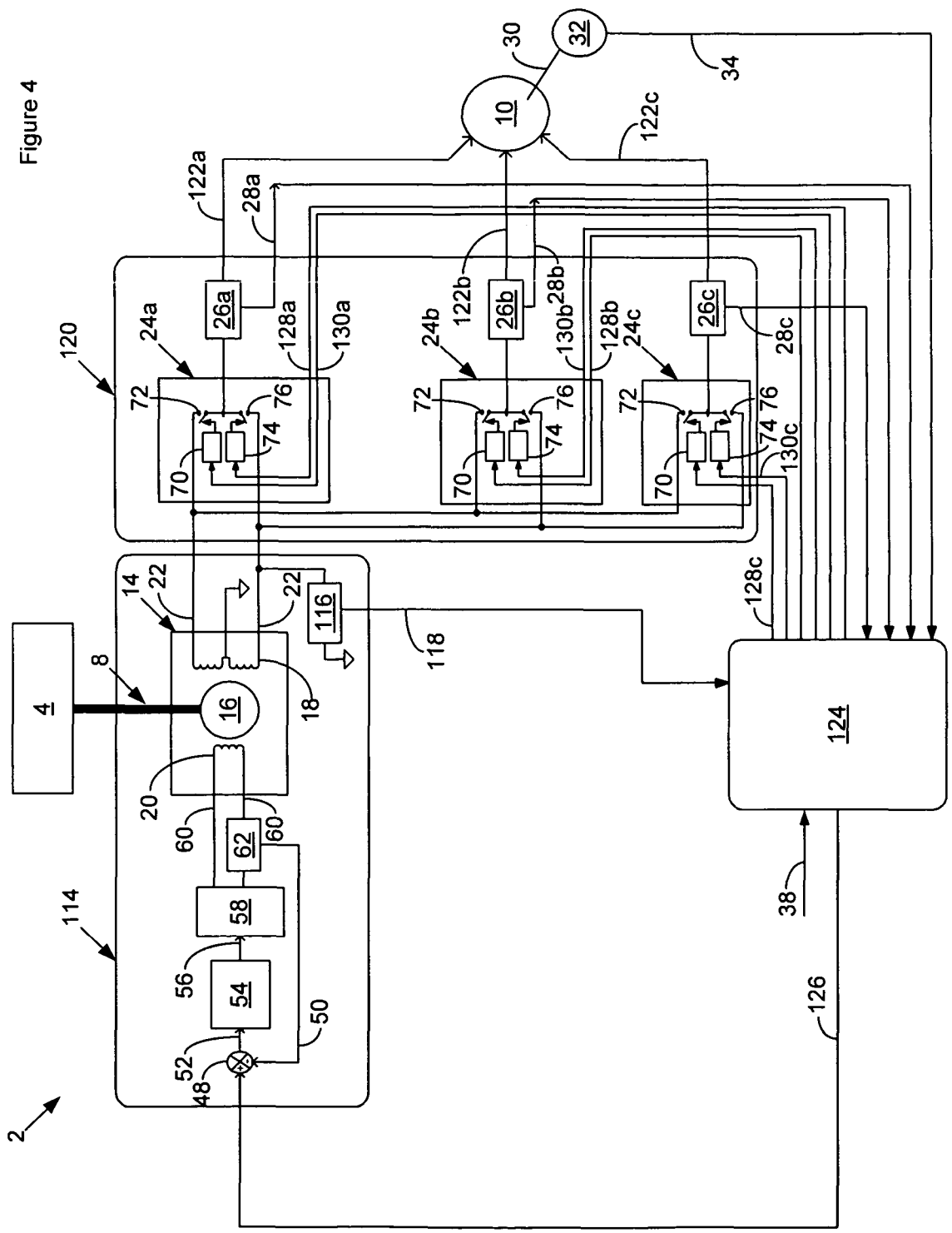
FIG. 4 is a schematic diagram of a motor drive system according to a second possible embodiment of the invention.

FIG. 4 is a schematic diagram of the motor drive system 2 according to a second possible embodiment of the invention. Similar to the first embodiment, the motor drive system 2 comprises a prime mover 4, but it couples to a single generator module 114 by way of the prime mover drive shaft 8. For this embodiment of the motor drive system 2, the motor drive system 2 will operate the AC motor 10 with N phases by means of the single generator module 114.

The single generator module 114 comprises the PMM 14 as described in connection with the generator module 6. It has the same PM rotor 16 and the stator 18 with the magnetic flux diverter circuit 20. Likewise, the prime mover 4 rotates the PM rotor 16 by way of the prime mover drive shaft 8 at a velocity sufficient to develop a HFAC current in the stator 18. The stator 18 has a centre-tapped single phase output with the centre tap grounded to provide a balanced single phase HFAC output with respect to ground on stator output lines 22. Unlike the generator module 6, the generator module 114 has an electrical potential difference sensor to sense the level of electrical potential difference present on the stator output lines 22, and it generates an electrical potential difference signal representative of the measured level on an electrical potential difference sensor output line 118.

Unlike the generator module 6, the generator module 114 outputs the balanced single phase HFAC output on stator output lines 22 to an N phase cycloconverter 120. The N phase cycloconverter 120 has N of the bi-directional switching circuits 24 to transform the balanced single phase HFAC output on stator output lines 22 to N variable low frequency AC motor control outputs on N cycloconverter output lines 122. Typically the motor 10 and the cycloconverter 120 will have three phases, and therefore three respective cycloconverter output lines 122. Alternatively, the motor 10 and the cycloconverter 120 may have two or more than three phases. Much the same as the first embodiment of the motor drive system 2, the current sensors 26 sense the level of current that the cycloconverter 120 supplies to each phase of the motor 10 and they generate respective current level output signals on their respective current sensor output lines 28.

A motor controller 124 receives the current level output signals on their respective current sensor output lines 28, the electrical potential difference signal on the electrical potential difference sensor output line 118 and the motor position signal on the position sensor output line 34, as well as the speed reference signal on the speed signal line 38, to generate a generator module control signal on a generator module control signal line 126 and for each bi-directional switching circuit 24 in the cycloconverter 120 a high side gate drive control signal on a respective high side gate drive control line 128 and a low side gate drive control signal on a respective low side gate drive control line 130.

The summer 48 in the generator module 114 receives the generator module control signal on the generator module control signal line 126 and subtracts it from the magnetic flux diverter circuit current signal on the magnetic flux diverter circuit current signal line 50 to control the magnetic flux diverter circuit current on the H-bridge output lines 60 to in turn control the level of the balanced single phase HFAC output on the stator output lines 22 much the same as described for the first embodiment of the motor drive system 2. However, in this case the generator module control signal on the generator module control signal line 126 does not have a variable low frequency AC component. Instead, the cycloconverter 120 generates the necessary variable low frequency AC fundamental of the variable low frequency AC motor control outputs on the cycloconverter output lines 122 in response to the high side gate drive control signals on their respective high side gate drive control lines 128 and the low side gate drive control signals on their respective low side gate drive control lines 130.

Figure 5:
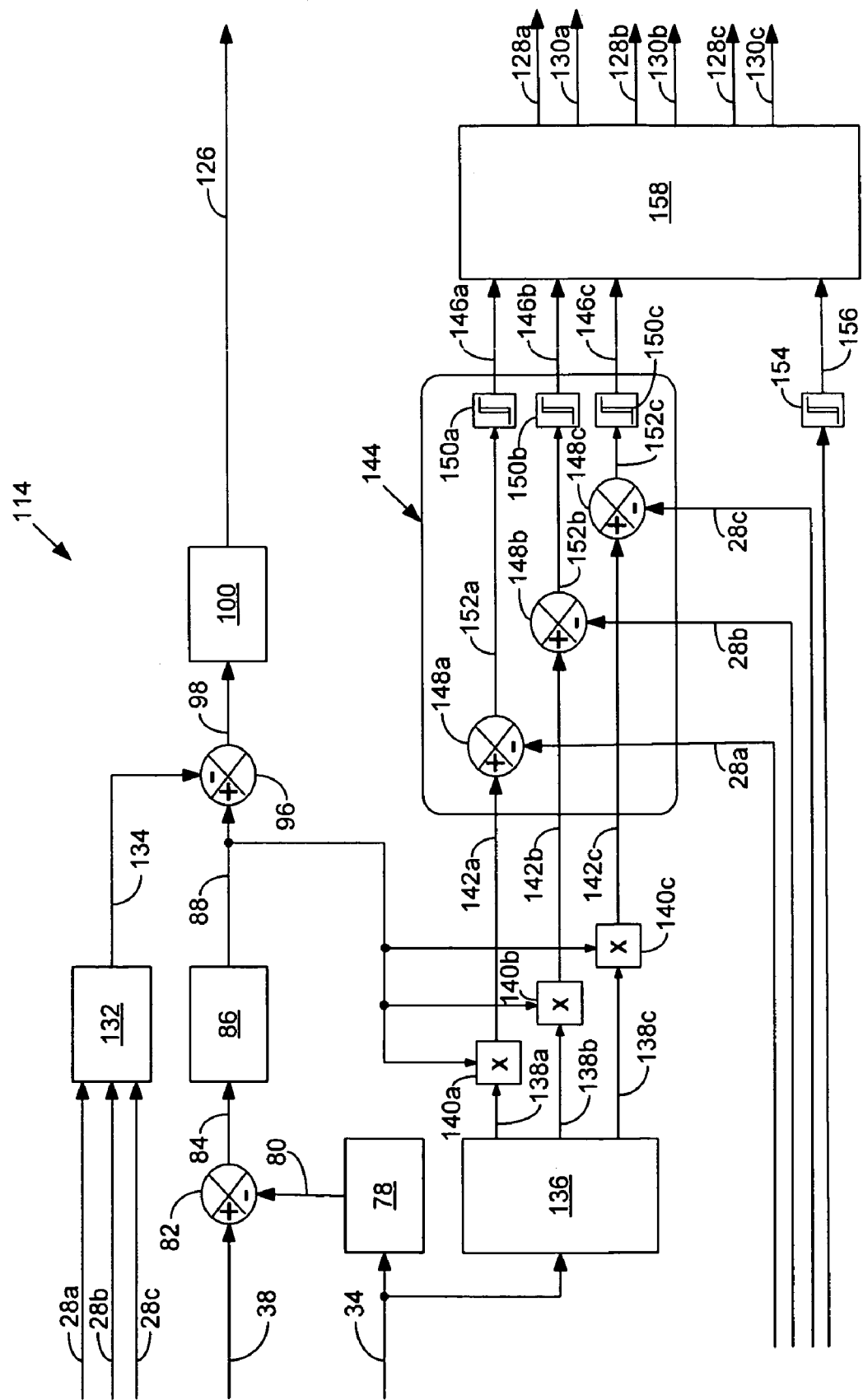
FIG. 5 is a schematic diagram of a motor controller according to a possible embodiment of the invention for the motor drive system shown in FIG. 4.

FIG. 5 is a schematic diagram of the motor controller 124 according to a possible embodiment of the invention for the motor drive system 2 according to the second embodiment shown in FIG. 4. The speed estimator circuit 78 in the motor controller 124 receives the motor position signal on the position sensor output line 34 and generates a respective motor speed signal on the speed estimator output line 80. The summer 82 receives the speed reference signal on the speed signal line 38 and the motor speed signal on the speed estimator output line 80 by way of an inverted input to generate a respective summer difference signal on the summer output line 84. The motor speed controller circuit 86 receives the summer difference signal on the summer output line 84 and generates a respective motor average reference current signal on the speed controller circuit output line 88.

An N phase signal rectifier 132, shown as a three phase rectifier in FIG. 4, receives the current level output signal from the current sensor 26 for each of the cycloconverter output lines 122 and generates a respective motor average current feedback signal on a rectifier output line 134. The summer 96 receives the motor average reference current signal on the speed controller circuit output line 88 and the motor average current feedback signal on the rectifier output line 134 by way of an inverted input to generate a summer difference signal on the summer output line 98. The proportional plus integral (PI) current regulator 100 receives the summer difference signal on the summer output line 98 to generate the generator module control signal on the generator module control signal line 126.

An N phase sine look-up table circuit 136, shown as a three phase sine look-up table circuit 136 in FIG. 5, receives the motor position signal on the position sensor output line 34 and generates respective sine value signals for each phase of the motor 10 on look-up table output lines 138. N multipliers 140, shown as three multipliers 140 in FIG. 5, each receive a respective one of the sine value signals on a respective one of the look-up table output lines 138 and the motor average reference current signal on the speed controller circuit output line 88 to generate a respective motor current reference signal for its respective phase of the motor 10 on a respective multiplier output line 142.

A hysteresis current controller 144 receives the motor current reference signal for each phase of the motor 10 on the multiplier output lines 142 and the current level output signal from the current sensor 26 for each of the cycloconverter output lines 122 to generate a respective hysteresis control output signal for each phase of the motor 10 on a respective hysteresis controller output line 146. As shown in FIG. 4, the hysteresis controller 144 may comprise a summer 148 coupled to a hysteresis circuit 150 by a summer output line 152 for each phase of the motor 10.

A hysteresis circuit 154 receives the electrical potential difference signal on the electrical potential difference sensor output line 118 and generates a respective hysteresis synchronisation signal on a hysteresis circuit output line 156. A signal steering block 158, such as described in co-pending patent application U.S. Ser. No. 12/435,534 to Nguyen et al., owned by the assignee and hereby incorporated by reference, receives the respective hysteresis control output signals on the respective hysteresis controller output lines 146 and the hysteresis synchronisation signal on the hysteresis circuit output line 156 to generate the high side gate drive control signals on the high side gate drive control lines 128 and the low side gate drive control signals on the low side gate drive control lines 130.

The described embodiments of the invention are only some illustrative implementations of the invention wherein changes and substitutions of the various parts and arrangement thereof are within the scope of the invention as set forth in the attached claims.

The invention claimed is:

1. A method of generating and controlling power for an alternating current (AC) motor by means of at least one controlled permanent magnet machine (PMM) with a permanent magnet (PM) rotor and a stator with a magnetic flux diverter circuit for controlling the output of the PMM, comprising the steps of:
   rotating the PM rotor at a velocity sufficient to develop a high frequency alternating current (HFAC) power output from the stator;
   transforming the HFAC output to produce a variable low frequency alternating current (AC) motor control output for the motor;
   sensing desired motor control parameters;
   generating a control signal responsive to the sensed parameters; and
   applying the control signal to the magnetic flux diverter circuit to control the motor control output.

2. The method of claim 1, wherein the step of transforming comprises transformation by means of bi-directional switching.

3. The method of claim 1, wherein the step of transforming comprises transformation by means of cycloconversion.

4. The method of claim 1, wherein the sensed motor control parameters comprise motor speed and torque.

5. The method of claim 1, wherein the sensed motor control parameters further comprise motor position.

6. The method of claim 1, wherein the sensed motor control parameters further comprise HFAC electrical potential difference.

7. The method of claim 1, wherein the control signal includes a variable low frequency AC component.

8. The method of claim 7, wherein N number of PMMs produce N phases of desired motor control output.

9. The method of claim 3, wherein one PMM produces one phase of HFAC power output and the cycloconversion produces N phases of variable low frequency AC motor control output.

10. A method of generating and controlling power for an alternating current (AC) motor with N phases by means of N controlled single-phase permanent magnet machines (PMMs), each with a permanent magnet (PM) rotor and a stator with a magnetic flux diverter circuit for controlling the output of the PMM, comprising the steps of:
  rotating the PM rotor of each PMM at a velocity sufficient to develop a high frequency alternating current (HFAC) power output from the stator of each PMM;
  transforming the HFAC output from each PMM to produce a variable low frequency alternating current (AC) motor control output for each respective phase of the motor;
  sensing desired motor control parameters for each respective phase of the motor;
  generating a respective variable frequency AC control signal for each PMM responsive to the sensed parameters for a respective phase of the motor; and
  applying the variable frequency AC control signal to the magnetic flux diverter circuit for its respective PMM to control the motor control output for the respective phase of the motor.

11. The method of claim 10, wherein the step of transforming comprises transformation by means of bi-directional switching.

12. The method of claim 10, wherein the sensed motor control parameters comprise motor speed and torque.

13. The method of claim 12, wherein the sensed motor control parameters further comprise motor position.

14. A method of generating and controlling power for an alternating current (AC) motor with N phases by means of one controlled permanent magnet machine (PMM) with a permanent magnet (PM) rotor and a stator with a magnetic flux diverter circuit for controlling the output of the PMM, comprising the steps of:
  rotating the PM rotor at a velocity sufficient to develop a high frequency alternating current (HFAC) power output from the stator;
  transforming the HFAC output to produce a variable low frequency alternating current (AC) motor control output with N phases for the motor;
  sensing desired motor control parameters for each respective phase of the motor;
  generating a control signal responsive to the sensed parameters; and
  applying the control signal to the magnetic flux diverter circuit of the PMM to control the N phase motor control output.

15. The method of claim 14, wherein the step of transforming comprises transformation by means of cycloconversion.

16. The method of claim 14, wherein the sensed motor control parameters further comprise HFAC electrical potential difference.

17. The method of claim 14, wherein the sensed motor control parameters further comprise motor position.

* * * * *